(12) United States Patent
Ishihara

(10) Patent No.: US 9,366,385 B2
(45) Date of Patent: Jun. 14, 2016

(54) TELESCOPIC-COVER FIXTURE

(71) Applicant: FANUC Corporation, Yamanashi (JP)

(72) Inventor: Mitsuyoshi Ishihara, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/262,847

(22) Filed: Apr. 28, 2014

(65) Prior Publication Data

US 2014/0338496 A1 Nov. 20, 2014

(30) Foreign Application Priority Data

May 20, 2013 (JP) .................................. 2013-002792

(51) Int. Cl.
| | |
|---|---|
| *F16P 1/00* | (2006.01) |
| *B23Q 11/08* | (2006.01) |
| *F16P 3/02* | (2006.01) |

(52) U.S. Cl.
CPC ............... *F16P 3/02* (2013.01); *B23Q 11/0825* (2013.01); *Y10T 74/219* (2015.01)

(58) Field of Classification Search
CPC .......... B23Q 11/0825; F16P 1/02; F16P 3/02; Y10T 74/219; Y10T 74/2193
USPC ........... 74/608, 609, 612–615; 160/202, 223; 409/134; 248/345, 506
See application file for complete search history.

(56) References Cited

U.S. PATENT DOCUMENTS

| | | | | |
|---|---|---|---|---|
| 3,578,061 | A | * | 5/1971 | Hascheck et al. ............. 160/202 |
| 3,824,890 | A | * | 7/1974 | Zettler et al. .................. 409/134 |
| 5,156,195 | A | * | 10/1992 | Wehler et al. ................. 160/202 |
| 5,169,223 | A | * | 12/1992 | Suzuki ............... B23Q 11/0825 160/202 |
| 5,871,283 | A | * | 2/1999 | Isobe et al. ...................... 384/15 |
| 2014/0373673 | A1 | * | 12/2014 | Nagao ............................. 74/608 |

FOREIGN PATENT DOCUMENTS

JP 2006181668 A 7/2006

* cited by examiner

*Primary Examiner* — Adam D Rogers
(74) *Attorney, Agent, or Firm* — Hauptman Ham, LLP

(57) ABSTRACT

A fixing member has such a shape that members that constitute a telescopic cover can be fixed and immovable. The fixing member is secured to the telescopic cover by means of fastening members such as bolts. The fixing member of a telescopic-cover fixture is shaped so that the telescopic cover is maximally contracted when the fixing member is secured to the cover. For example, the fixing member may be L-shaped, U-shaped, or in the shape of a rectangular tube that covers the entire cover member.

14 Claims, 6 Drawing Sheets

TOP VIEW OF MACHINE

FRONT VIEW OF MACHINE

TOP VIEW OF MACHINE

FRONT VIEW OF MACHINE

TELESCOPIC-COVER FIXTURE

RELATED APPLICATIONS

The present application claims priority to Japanese Utility Model Application Number 2013-002792U, filed May 20, 2013.

BACKGROUND OF THE INVENTION

1. Field of the Invention

The present invention relates to a telescopic-cover fixture of a machine tool.

2. Description of the Related Art

In general, a machine tool in which a machining area is covered by a splash guard is provided with a telescopic cover, which covers components for driving a table, saddle, or column of the machine tool to prevent chips produced during machining from scattering to the outside of the machining area and depositing on the components. Japanese Patent Application Laid-Open No. 2006-181668 discloses an X-axis feed guide provided with a telescopic cover that is disposed so as to cover the left and right sides of a table in the center.

Conventionally, in assembling the telescopic cover to the machine, a cover is temporarily fixed to a fixing portion of the telescopic cover for the table, saddle, or column. Thereafter, the machine is moved to cause the telescopic cover to expand and contract several times so that the cover can be finally fixed without interfering with the motion of the machine. A method of assembling the telescopic cover is not disclosed in Japanese Patent Application Laid-Open No. 2006-181668.

Since the telescopic cover is allowed to expand and contract as it is assembled, care must be taken not to allow the telescopic cover to move unexpectedly when it is brought to a predetermined fixing position. If the telescopic cover comprises a number of components or is large-sized, moreover, it is so heavy that its operation is more complicated.

SUMMARY OF THE INVENTION

Accordingly, in view of the problems of the prior art described above, the object of the present invention is to provide a telescopic-cover fixture capable of easily assembling a telescopic cover configured to protect axis drive components against chips produced as a machine tool is operated.

A telescopic-cover fixture according to the present invention is used to mount a machine tool with a telescopic cover, which comprises a plurality of covers successively stacked on one another, is formed to be capable of expansion and contraction in the direction of movement of a movable part of the machine tool, and covers a drive member for driving the movable part. This telescopic-cover fixture comprises a fixing member, configured to keep the covers constituting the telescopic cover from moving in the movement direction of the movable part, and a fastening member configured to secure the fixing member to the telescopic cover.

The fixing member may be configured to restrain movement in a horizontal direction across the movement direction of the movable part.

The fixing member may be configured to restrain movement in a vertical direction across the movement direction of the movable part.

The fixing member may be in the shape of an L, U, or rectangular tube.

The fastening member includes a bolt or a magnet.

According to the present invention arranged in this manner, there can be provided a telescopic-cover fixture capable of easily assembling a telescopic cover configured to protect axis drive components against chips produced as a machine tool is operated.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1A:
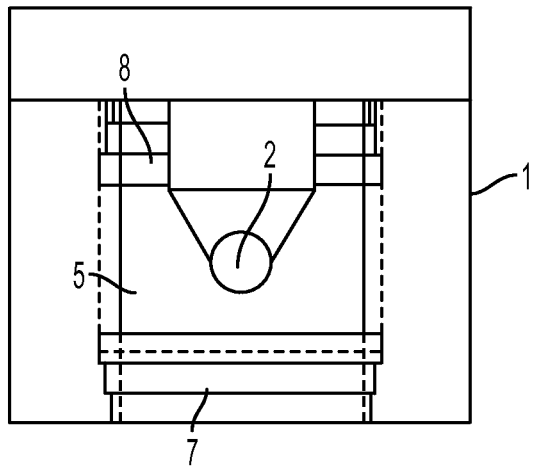
FIGS. 1A and 1B are schematic top and front views, respectively, illustrating a first example of a machine tool.
Figure 1B:
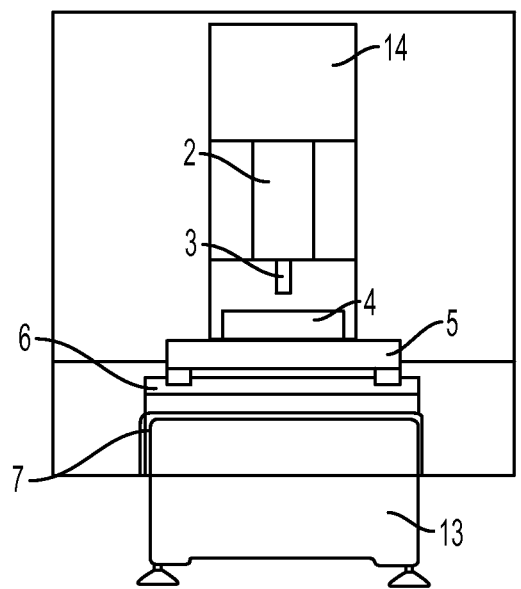

FIGS. 1A and 1B are schematic top and front views, respectively, showing a first example of a machine tool. A saddle 6 is supported over a bed 13 of the machine tool with a saddle movement mechanism 22 therebetween. A table 5 is supported over the saddle 6 with a table movement mechanism therebetween. Further, a column 14 is provided rising from the top of the rear part of the bed 13. A spindle 2 fitted with a tool 3 is attached to the top of the front part of the column 14. The table 5 carries thereon a workpiece 4 to be machined by the tool 3 on the spindle 2. A cover 1, called a splash guard, defines a machining space that isolates the saddle 6, table 5, column 14, spindle 2, and tool 3 from the outside.

The saddle 6 is supported by the saddle movement mechanism 22 so as to be movable perpendicular to the drawing plane of FIG. 1B. Telescopic covers 7 and 8 prevent chips from accumulating on a drive mechanism for moving the saddle. One end of the telescopic cover 7 is secured to the front end portion of the saddle 6, and the other end to the inside of the front part of the cover 1 or a predetermined spot on the bed 13. Further, one end of the telescopic cover 8 is secured to the rear end portion of the saddle 6, and the other end to the front side of the bottom part of the column 14. When the saddle 6 moves to the front side of the machine, the telescopic cover 7 contracts, and the telescopic cover 8 expands.

Figure 2A:
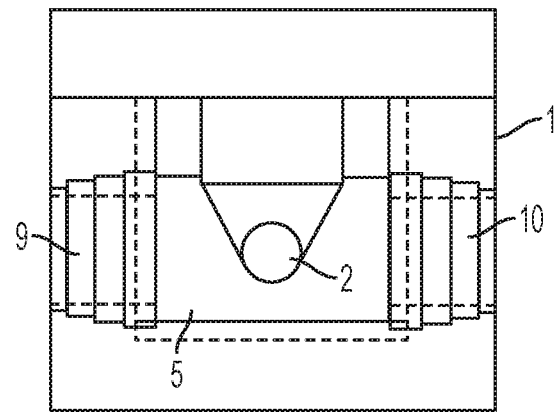
FIGS. 2A and 2B are schematic top and front views, respectively, illustrating a second example of the machine tool.
Figure 2B:
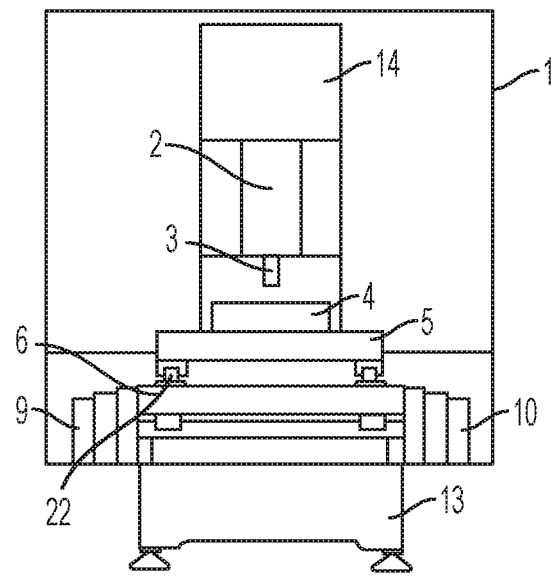

FIGS. 2A and 2B are schematic top and front views, respectively, showing a second example of the machine tool. The second example of the machine tool, compared with the first example, is configured so that the saddle 6 moves horizontally relative to the drawing plane of FIG. 2B and the table 5 moves perpendicular to the drawing plane of FIG. 2B. Telescopic covers 9 and 10 are disposed between the cover 1 and the opposite sides of the saddle 6.

Figure 3A:
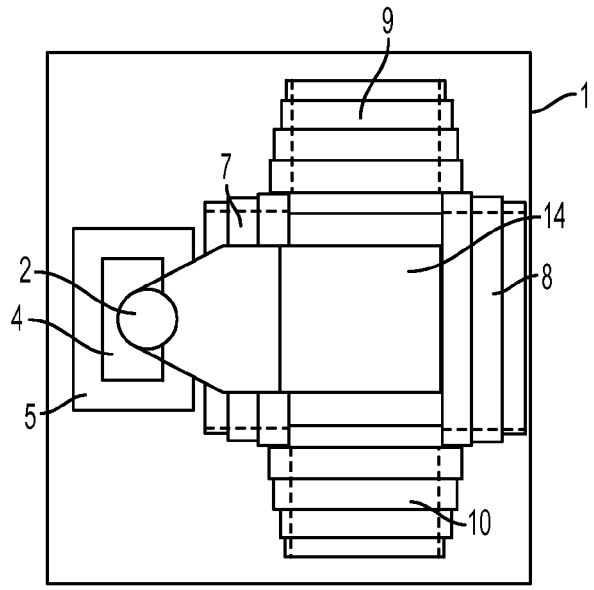
FIGS. 3A and 3B are schematic top and front views, respectively, illustrating a third example of the machine tool.
Figure 3B:
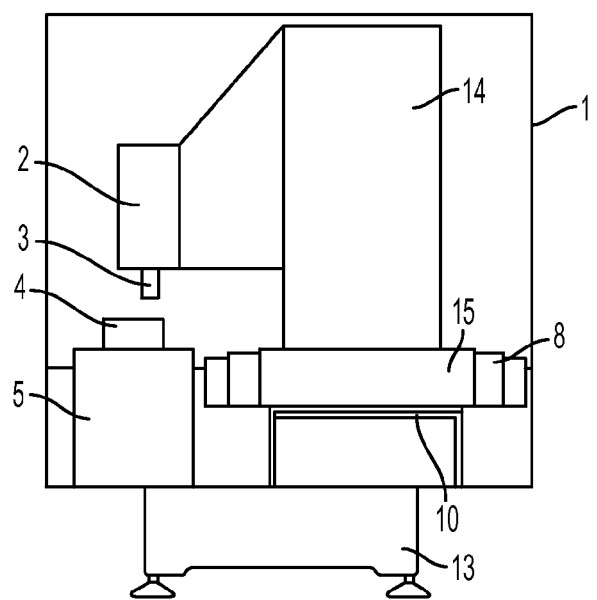

FIGS. 3A and 3B are schematic top and front views, respectively, showing a third example of the machine tool. In the third example of the machine tool, the table 5 is secured to the bed 13, and the column 14 is moved relative to the workpiece 4 on the table 5 by a two-axis movement mechanism of a column movement mechanism section 15. The telescopic covers 9 and 10 are disposed between the cover 1 and the opposite sides of the movement mechanism of the column movement mechanism section 15 in the direction perpendicular to the drawing plane of FIG. 3B. Further, the telescopic covers 7 and 8 are disposed between the cover 1 or the table 5 and the opposite sides of the movement mechanism of the column movement mechanism section 15 in the horizontal direction on the drawing plane of FIG. 3B.

FIGS. 4A, 4B, 4C, 5 and 6 show a telescopic-cover fixture according to the present invention. This fixture facilitates an operator to assemble the telescopic cover to mounting portions, such as the side portions of the saddle, table, or column movement mechanism section of the machine tool.

Figure 4A:
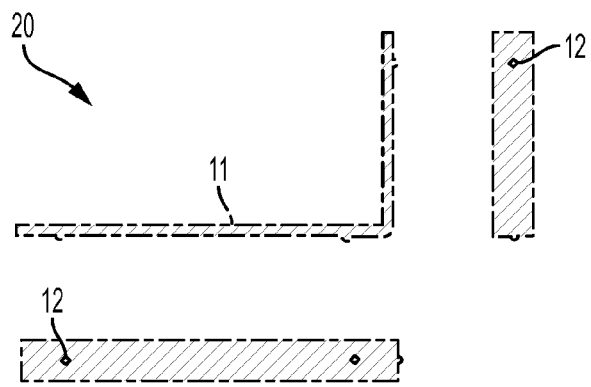
FIGS. 4A, 4B and 4C are views illustrating a telescopic-cover fixture.
Figure 4B:
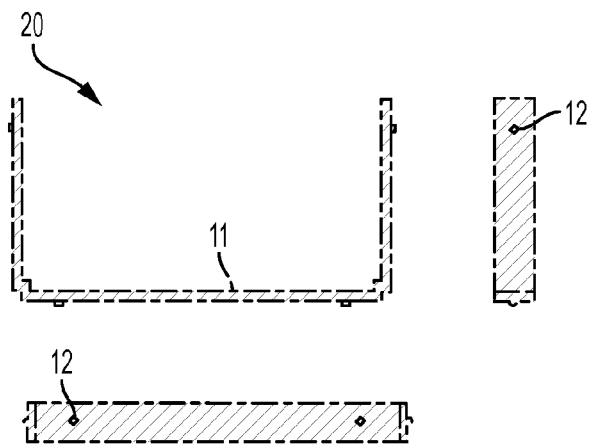
Figure 4C:
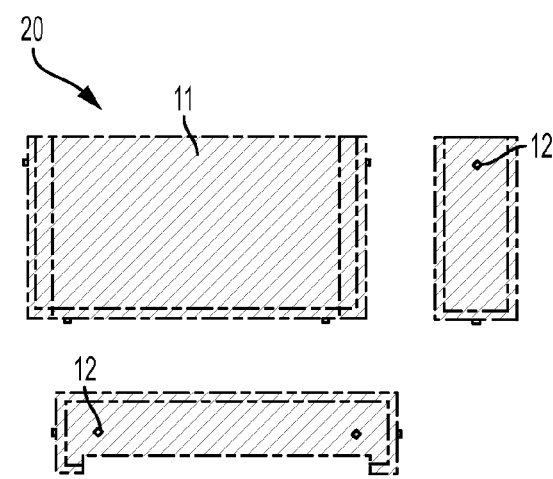

FIGS. 4A, 4B and 4C are top, right-side, and front views, respectively, of a telescopic-cover fixture 20. FIG. 4A shows an example of the telescopic-cover fixture with an L-shaped fixing member. FIG. 4B shows another example of the telescopic-cover fixture with a U-shaped fixing member. FIG. 4C shows another example of the telescopic-cover fixture with a fixing member shaped so as to cover the entire cover member.

As shown in FIGS. 4A to 4C, the telescopic-cover fixture 20 according to the present invention comprises a fixing member 11 and fastening members 12. The fixing member 11 for fixing the telescopic cover 16 as a single unit is secured by using the fastening members 12, e.g., bolts. If the bolts are used as the fastening members 12, bolt holes for the bolts to go into, are formed in predetermined portions of the fixing member 11. If the telescopic cover 16 is fixed in a maximally contracted state, it is so compact that it can be easily transported to a place of assembly.

Figure 5A:
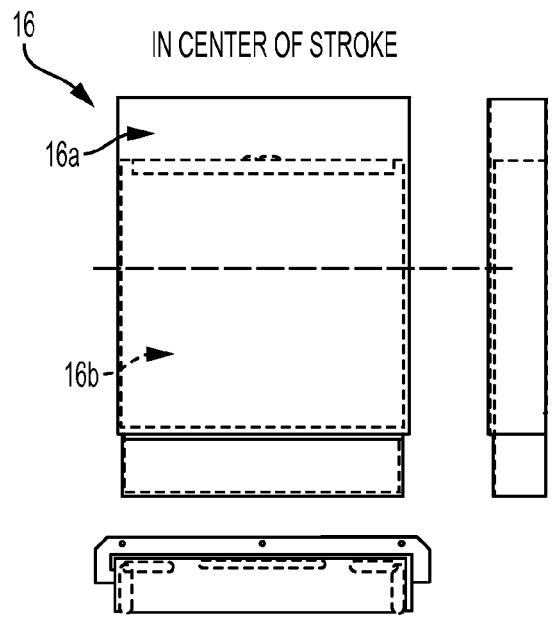
FIGS. 5A and 5B are views illustrating how a telescopic cover expands and contracts.
Figure 5B:
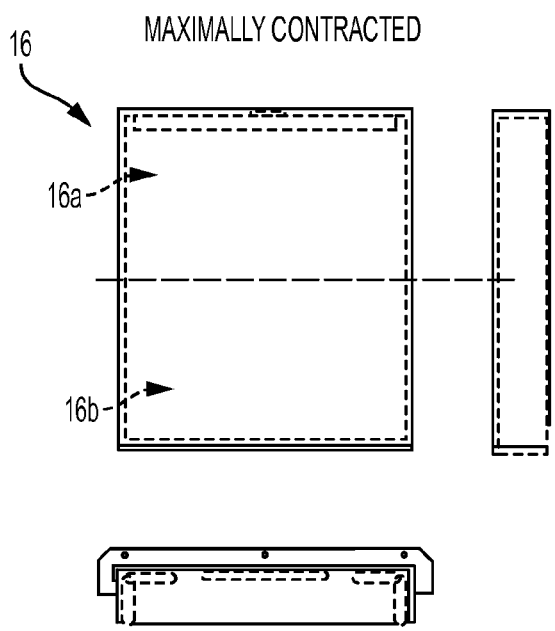

FIGS. 5A and 5B show how the telescopic cover expands and contracts. FIG. 5A shows a state in which first and second covers 16a and 16b are relatively located in the center of a movement stroke. FIG. 5B shows the telescopic cover 16 in the maximally contracted state.

Figures 6A, 6B:
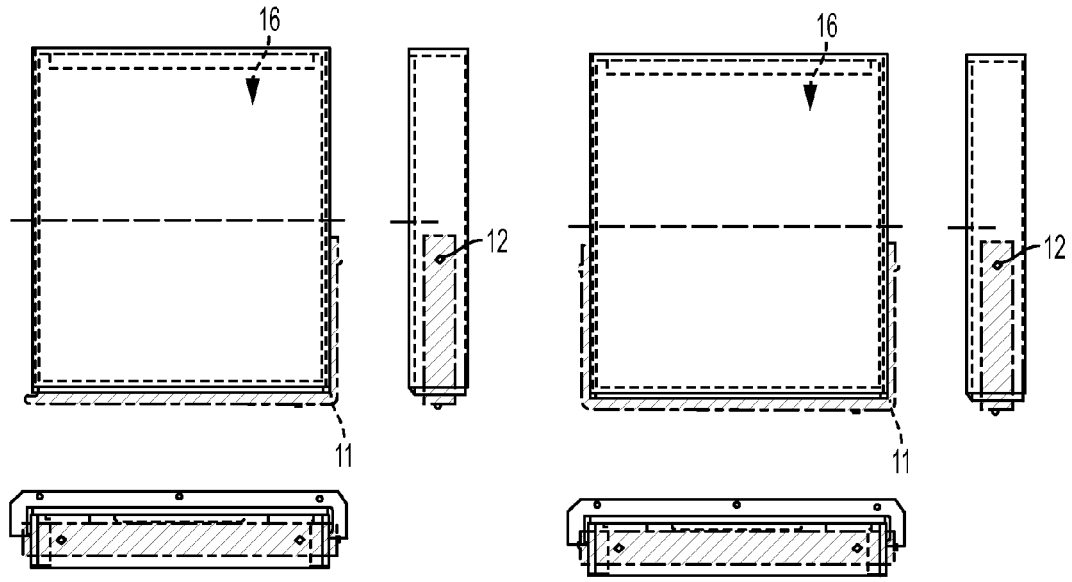
FIGS. 6A, 6B and 6C are views illustrating examples in which the telescopic cover is fixed by different fixtures.
Figure 6C:
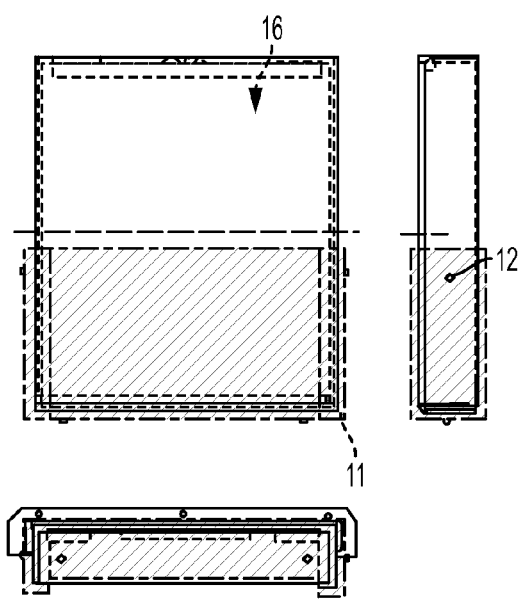

FIGS. 6A, 6B and 6C show examples in which the telescopic cover is fixed by different fixtures. FIG. 6A shows an example of the telescopic-cover fixture with the L-shaped fixing member. FIG. 6B shows another example of the telescopic-cover fixture with the U-shaped fixing member. FIG. 6C shows another example of the telescopic-cover fixture with the fixing member shaped so as to cover the entire cover member.

In securing the fixing member 11 of the telescopic-cover fixture 20 to the telescopic cover 16, it is assumed that the cover 16 is maximally contracted, as shown in FIG. 5B, and the fixing member 11 is shaped so that the constituent members of the telescopic cover 16 can be fixed and immovable. Alternatively, in securing the fixing member 11 to the telescopic cover 16, magnets may be used in place of the bolts as the fastening members 12. If the magnets are used as the fastening members 12, they are secured to predetermined portions of the fixing member 11. The fixing member 11 serves to keep the second cover 16b of the telescopic cover 16 from moving across the movement direction and the horizontal direction. Further, the fixing member 11 serves to keep the second cover 16b from moving across the vertical direction and the movement direction.

The shape of the fixing member 11 of the telescopic-cover fixture 20 is not particularly restricted only if the telescopic cover 16 is maximally contracted when the fixing member 11 is secured to it. By way of example, the fixing member 11 may be L-shaped, as shown in FIG. 4A, U-shaped, as shown in FIG. 4B, or in the shape of, for example, a rectangular tube that covers the entire cover member, as shown in FIG. 4C. Alternatively, the fixing member 11 may be of any other suitable shape (not shown).

The following is a description of a method of assembling the telescopic cover 16 to a predetermined portion of the machine tool. In the case of the telescopic cover secured to the table 5 and the saddle 6, the table 5 first moves from one end to the opposite end of the movement stroke, one end of the telescopic cover 16 fixed by the fixing member 11 is secured to the table 5, and the other end is secured to the saddle 6 or the cover 1. The bolts for use as the fastening members 12 that secure the fixing member 11 is removed, and the fixing member 11 is disengaged from the telescopic cover 16. Thereafter, the table 5 is moved to confirm the expansion or contraction of the telescopic cover 16, and the position of the cover is adjusted as required.

The same operation is performed in mounting the telescopic cover 16 between the saddle 6 and the bed 13 or the cover 1 and in mounting the telescopic cover 16 between the column 14 and the saddle 6 or the bed 13.

In assembling and finally securing the telescopic cover 16 to the machine, the telescopic cover 16 is conventionally maximally contracted. By means of the telescopic-cover fixture 20 of the present invention described above, the telescopic cover 16 can be assembled to the machine in the maximally contracted state. Thus, the assembly work can be simplified, and the assembling position and the smoothness of the movement of the cover after the disengagement of the fixing member 11 can be easily confirmed and adjusted.

While the telescopic cover 16 described above is configured so that the first and second covers 16a and 16b are movable relative to each other, this configuration is also applicable to assembly work for the telescopic covers 7 to 10.

The invention claimed is:

1. A telescopic-cover fixture configured to mount a telescopic cover to a machine tool having a movable part and a drive member configured to drive the movable part,
    wherein
    the telescopic cover includes a plurality of covers successively stacked on one another,
    the telescopic cover is expandable and contractible in a movement direction of the movable part of the machine tool, and
    the telescopic cover covers the drive member,
the telescopic-cover fixture comprising:
    a fixing member configured to cover and surround at least one corner of the telescopic cover to keep the covers constituting the telescopic cover from moving in the movement direction of the movable part; and
    a fastening member configured to secure the fixing member to the telescopic cover.

2. The telescopic-cover fixture according to claim 1, wherein the fixing member is configured to restrain a movement of the movable part in a horizontal direction across the movement direction of the movable part.

3. The telescopic-cover fixture according to claim 1, wherein the fixing member is configured to restrain a movement of the movable part in a vertical direction across the movement direction of the movable part.

4. The telescopic-cover fixture according to claim 1, wherein the fixing member is in an L shape.

5. The telescopic-cover fixture according to claim 1, wherein the fastening member is a bolt or a magnet.

6. The telescopic-cover fixture according to claim 1, wherein the fixing member is in a U shape.

7. The telescopic-cover fixture according to claim 1, wherein the fixing member is in a shape of a rectangular tube.

8. A telescopic cover and a telescopic-cover fixture in combination comprising:

the telescopic cover including a plurality of covers successively stacked on one another; and the telescopic-cover fixture configured to mount the telescopic cover to a machine tool having a movable part and a drive member configured to drive the movable part, wherein the telescopic cover is expandable and contractible in a movement direction of the movable part of the machine tool, the telescopic cover is configured to cover the drive member of the machine tool, and the telescopic-cover fixture includes a fixing member covering and surrounding at least one corner of the telescopic cover to keep the covers constituting the telescopic cover from moving in the movement direction of the movable part; and a fastening member securing the fixing member to the telescopic cover.

9. The telescopic cover and the telescopic-cover fixture in combination according to claim 8, wherein the fixing member is configured to restrain a movement of the movable part in a horizontal direction across the movement direction of the movable part.

10. The telescopic cover and the telescopic-cover fixture in combination according to claim 8, wherein the fixing member is configured to restrain a movement of the movable part in a vertical direction across the movement direction of the movable part.

11. The telescopic cover and the telescopic-cover fixture in combination according to claim 8, wherein the fixing member is in an L shape.

12. The telescopic cover and the telescopic-cover fixture in combination according to claim 8, wherein the fastening member is a bolt or a magnet.

13. The telescopic cover and the telescopic-cover fixture in combination according to claim 8, wherein the fixing member is in a U shape.

14. The telescopic cover and the telescopic-cover fixture in combination according to claim 8, wherein the fixing member is in a shape of a rectangular tube.

* * * * *